United States Patent
Hsiao et al.

(10) Patent No.: US 7,024,961 B2
(45) Date of Patent: Apr. 11, 2006

(54) PEDAL STRUCTURE FOR A BICYCLE

(76) Inventors: Chin-He Hsiao, 58, Ma Yuan West St., Taichung (TW); Chin-Long Xie, 58, Ma Yuan West St., Taichung (TW)

( * ) Notice: Subject to any disclaimer, the term of this patent is extended or adjusted under 35 U.S.C. 154(b) by 289 days.

(21) Appl. No.: 10/402,768

(22) Filed: Mar. 29, 2003

(65) Prior Publication Data

US 2004/0187636 A1    Sep. 30, 2004

(51) Int. Cl.
*G05G 1/14*    (2006.01)

(52) U.S. Cl. ..................... 74/594.6; 74/594.4

(58) Field of Classification Search .............. 74/594.4, 74/594.6; 36/131; G05G 1/14; B62M 3/08
See application file for complete search history.

(56) References Cited

U.S. PATENT DOCUMENTS

| | | | |
|---|---|---|---|
| 6,112,620 A * | 9/2000 | Chen | 74/594.6 |
| 6,170,357 B1 * | 1/2001 | Chen | 74/594.6 |
| 6,729,204 B1 * | 5/2004 | Chen | 74/594.6 |
| 2002/0170382 A1 * | 11/2002 | Yang | 74/594.6 |
| 2005/0005729 A1 * | 1/2005 | Chen | 74/594.6 |
| 2005/0081679 A1 * | 4/2005 | Chen | 74/594.6 |

FOREIGN PATENT DOCUMENTS

DE    019935936 A1 *    2/2001

* cited by examiner

*Primary Examiner*—Vinh T. Luong
(74) *Attorney, Agent, or Firm*—Alan D. Kamrath; Nikolai & Mersereau, P.A.

(57) ABSTRACT

A pedal structure for a bicycle includes a pedal body, and an elastic clamping device. The elastic clamping device is mounted on each of the two opposite sides of the pedal body and includes a front binding plate, a rear binding plate, a pivot shaft, at least one torsion spring, an urging plate, and an adjusting bolt. Thus, the cleat can be mounted on and detached from the pedal body easily and conveniently, and can be clamped on the pedal body rigidly and stably by the elastic clamping force of the front binding plate and the rear binding plate.

8 Claims, 12 Drawing Sheets

PEDAL STRUCTURE FOR A BICYCLE

BACKGROUND OF THE INVENTION

1. Field of the Invention

The present invention relates to a pedal structure for a bicycle, and more particularly to a pedal structure for a bicycle, wherein the cleat can be mounted on and detached from the pedal body easily and conveniently, and can be clamped on the pedal body rigidly and stably by the elastic clamping force of the front binding plate and the rear binding plate.

2. Description of the Related Art

A first conventional pedal structure for a bicycle in accordance with the prior art shown in FIG. 11 comprises a pedal body 70, and a clamping device 72. The pedal body 70 is provided with a spindle 71. The clamping device 72 is mounted on the pedal body 70, and includes a front binding plate 73, a rear binding plate 74, a torsion spring 75, and an adjusting bolt 76. A cleat (not shown) is secured on the bottom of a special shoe (not shown) which is used for the racing sportsman. In assembly, the cleat is mounted on the pedal body 70 and clamped by the front binding plate 73 and the rear binding plate 74. However, the front binding plate 73 is screwed on the pedal body 70. Thus, the cleat is mounted on the pedal body 70 by the single clamping force provided by the rear binding plate 74, so that the cleat cannot be mounted on the pedal body 70 rigidly and stably. In addition, it is difficult to place the cleat between the front binding plate 73 and the rear binding plate 74, thereby causing inconvenience to the user in assembly and disassembly.

A second conventional pedal structure for a bicycle in accordance with the prior art shown in FIG. 12 comprises a pedal body 80, and a clamping device 82. The pedal body 80 is provided with a spindle 81. The clamping device 82 is mounted on the pedal body 80, and includes two parallel metallic bars 84 secured on the pedal body 80. However, the cleat 86 cannot be mounted on the pedal body 80 rigidly and stably by the two parallel metallic bars 84.

SUMMARY OF THE INVENTION

The present invention is to mitigate and/or obviate the disadvantage of the conventional pedal structures for a bicycle.

The primary objective of the present invention is to provide a pedal structure for a bicycle, wherein the front binding plate and the rear binding plate provide an inward directed clamping force and form an elastic receiving space for clamping the cleat in an elastic manner, so that the cleat can be mounted on and detached from the pedal body easily and conveniently, thereby facilitating assembly and disassembly of the shoe.

Another objective of the present invention is to provide a pedal structure for a bicycle, wherein the cleat can be clamped on the pedal body rigidly and stably by the elastic clamping force of the front binding plate and the rear binding plate.

A further objective of the present invention is to provide a pedal structure for a bicycle, wherein the clamping force applied on the cleat is evenly distributed by the front binding plate and the rear binding plate, so that the cleat can be mounted on and detached from the pedal body easily and conveniently, thereby saving the manual energy.

A further objective of the present invention is to provide a pedal structure for a bicycle, wherein the front binding plate and the rear binding plate co-operate to provide a larger clamping force, so that the cleat can be clamped on the pedal body rigidly and stably.

A further objective of the present invention is to provide a pedal structure for a bicycle, wherein the distance between the pivot ear and the clamping portion of the front binding plate is shorter than that between the pivot ear and the concave portion of the rear binding plate, so that the torque required for rotating the front binding plate is greater than that required for rotating the rear binding plate. Thus, the front end of the cleat is initially inserted into the front binding plate without having to provide a torque, and the rear end of the cleat is then snapped into the rear binding plate by applying a smaller torque, thereby facilitating operation of the user, saving the manual energy, and satisfying the ergonomic design.

In accordance with the present invention, there is provided a pedal structure for a bicycle, comprising a pedal body, and an elastic clamping device, wherein:

the pedal body has two opposite sides;

the elastic clamping device is mounted on each of the two opposite sides of the pedal body, and includes a front binding plate, a rear binding plate, a pivot shaft, at least one torsion spring, an urging plate, and an adjusting bolt, wherein:

the pivot shaft of the elastic clamping device is secured on each of the two opposite sides of the pedal body;

the front binding plate of the elastic clamping device is pivotally mounted on the pivot shaft;

the rear binding plate of the elastic clamping device is pivotally mounted on the pivot shaft;

the adjusting bolt of the elastic clamping device is extended through the rear binding plate;

the urging plate of the elastic clamping device is secured on a distal end of the adjusting bolt;

the at least one torsion spring of the elastic clamping device is pivotally mounted on the pivot shaft and has a first end passed through a gap defined between the front binding plate and the rear binding plate and urged on the front binding plate and a second end urged on the urging plate;

the front binding plate has an inward directed clamping force provided by the urging force of the at least one torsion spring; and the rear binding plate has an inward directed clamping force provided by the urging force of the at least one torsion spring.

Further benefits and advantages of the present invention will become apparent after a careful reading of the detailed description with appropriate reference to the accompanying drawings.

DETAILED DESCRIPTION OF THE INVENTION

Figure 1:
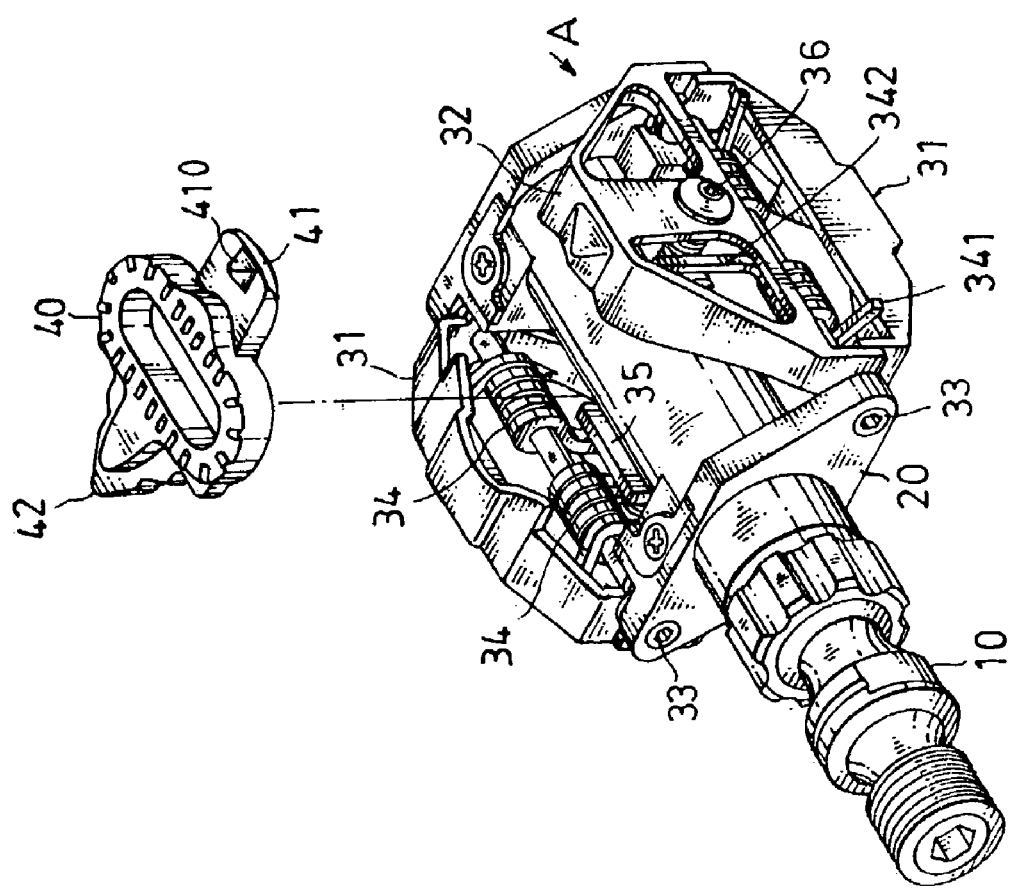
FIG. 1 is a partially exploded perspective view of a pedal structure for a bicycle in accordance with the preferred embodiment of the present invention.
Figure 2:
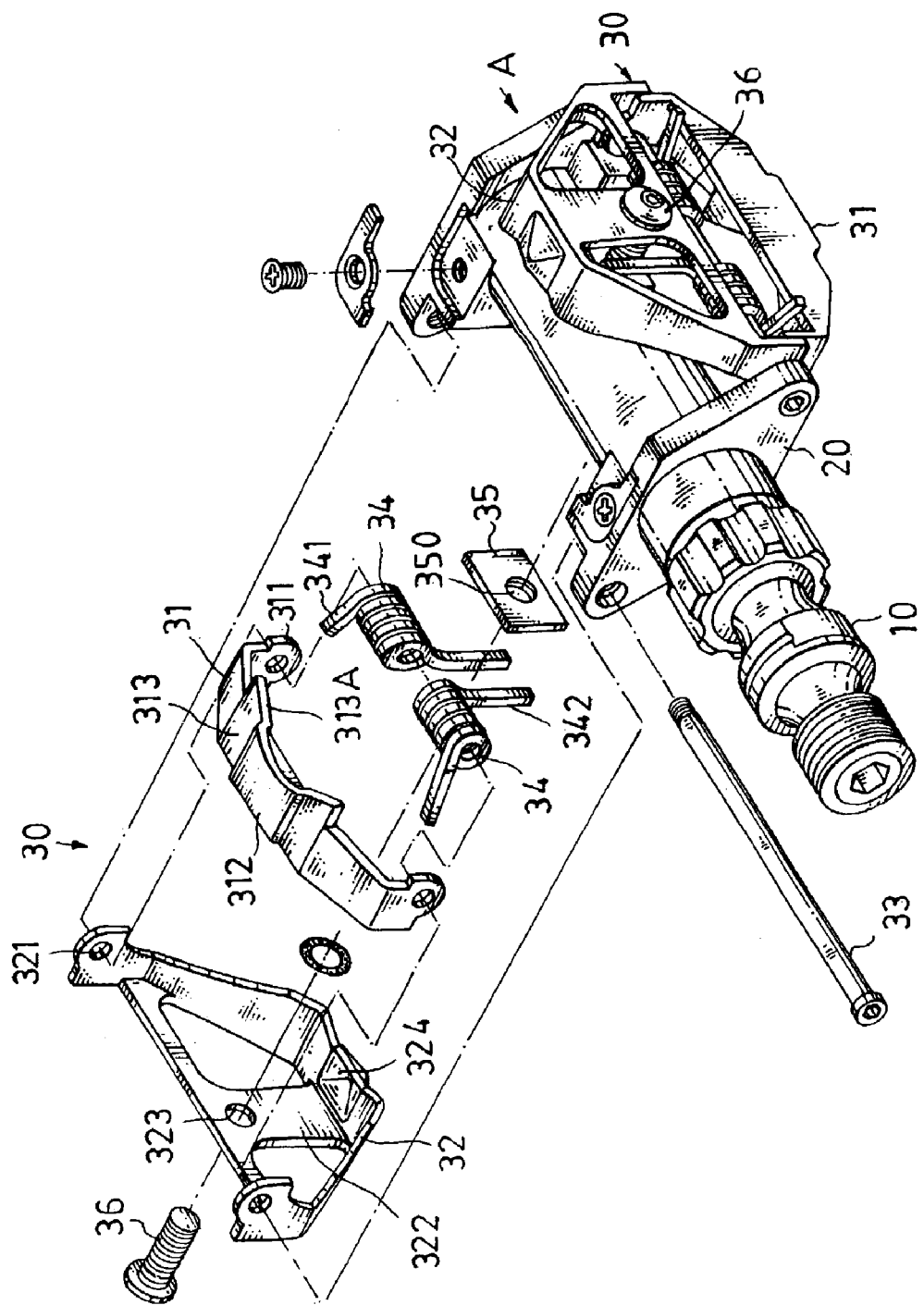
FIG. 2 is an exploded perspective view of the pedal structure for a bicycle in accordance with the preferred embodiment of the present invention.

Referring to the drawings and initially to FIGS. 1–6, a pedal structure "A" for a bicycle in accordance with the preferred embodiment of the present invention comprises a pedal body 20, and an elastic clamping device 30.

The pedal body 20 has two opposite sides and is provided with a spindle 10.

The elastic clamping device 30 is mounted on each of the two opposite sides of the pedal body 20, and includes a front binding plate 31, a rear binding plate 32, a pivot shaft 33, two torsion springs 34, an urging plate 35, and an adjusting bolt 36.

In assembly, two elastic clamping devices 30 are each mounted on a respective one of the two opposite sides of the pedal body 20, wherein the front binding plate 31 and the rear binding plate 32 of one of the two elastic clamping devices 30 face the rear binding plate 32 and the front binding plate 31 and of the other of the two elastic clamping devices 30 respectively.

The pivot shaft 33 of the elastic clamping device 30 is secured on each of the two opposite sides of the pedal body 20.

The front binding plate 31 of the elastic clamping device 30 is substantially inverted U-shaped. The front binding plate 31 of the elastic clamping device 30 is pivotally mounted on the pivot shaft 33. Preferably, the front binding plate 31 of the elastic clamping device 30 has two sides each formed with a pivot ear 311 pivotally mounted on the pivot shaft 33. The front binding plate 31 of the elastic clamping device 30 has a center formed with a protruding clamping portion 312. The clamping portion 312 of the front binding plate 31 has two sides each formed with a stepped portion 313 which has a front end formed with a resting edge 313A.

The rear binding plate 32 of the elastic clamping device 30 is pivotally mounted on the pivot shaft 33. Preferably, the rear binding plate 32 of the elastic clamping device 30 has two sides each formed with a pivot ear 321 pivotally mounted on the pivot shaft 33. The rear binding plate 32 of the elastic clamping device 30 has a rear side 322 formed with a through hole 323. The rear binding plate 32 of the elastic clamping device 30 has a bottom formed with a concave portion 324.

The adjusting bolt 36 of the elastic clamping device 30 is extended through the through hole 323 of the rear binding plate 32.

The urging plate 35 of the elastic clamping device 30 is secured on a distal end of the adjusting bolt 36. Preferably, the urging plate 35 of the elastic clamping device 30 is formed with a screw bore 350 screwed on the distal end of the adjusting bolt 36.

Each of the two torsion springs 34 of the elastic clamping device 30 is pivotally mounted on the pivot shaft 33. Each of the two torsion springs 34 of the elastic clamping device 30 has a first end 341 passed through a gap "B" (see FIG. 3) defined between the front binding plate 31 and the rear binding plate 32 and urged on the front binding plate 31 and a second end urged on the urging plate 35.

Figure 3:
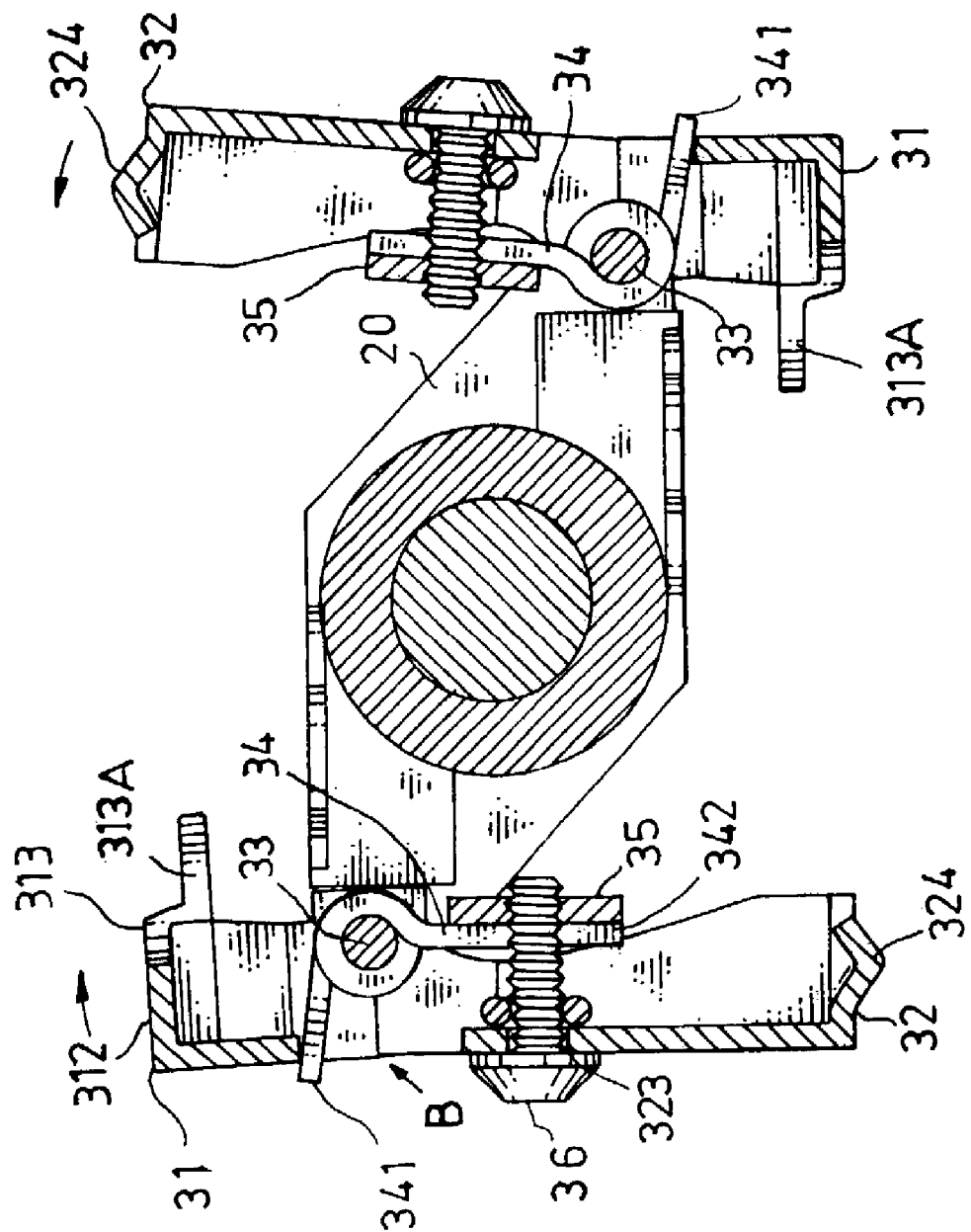
FIG. 3 is a side plan cross-sectional assembly view of the pedal structure for a bicycle as shown in FIG. 2.
Figure 4:
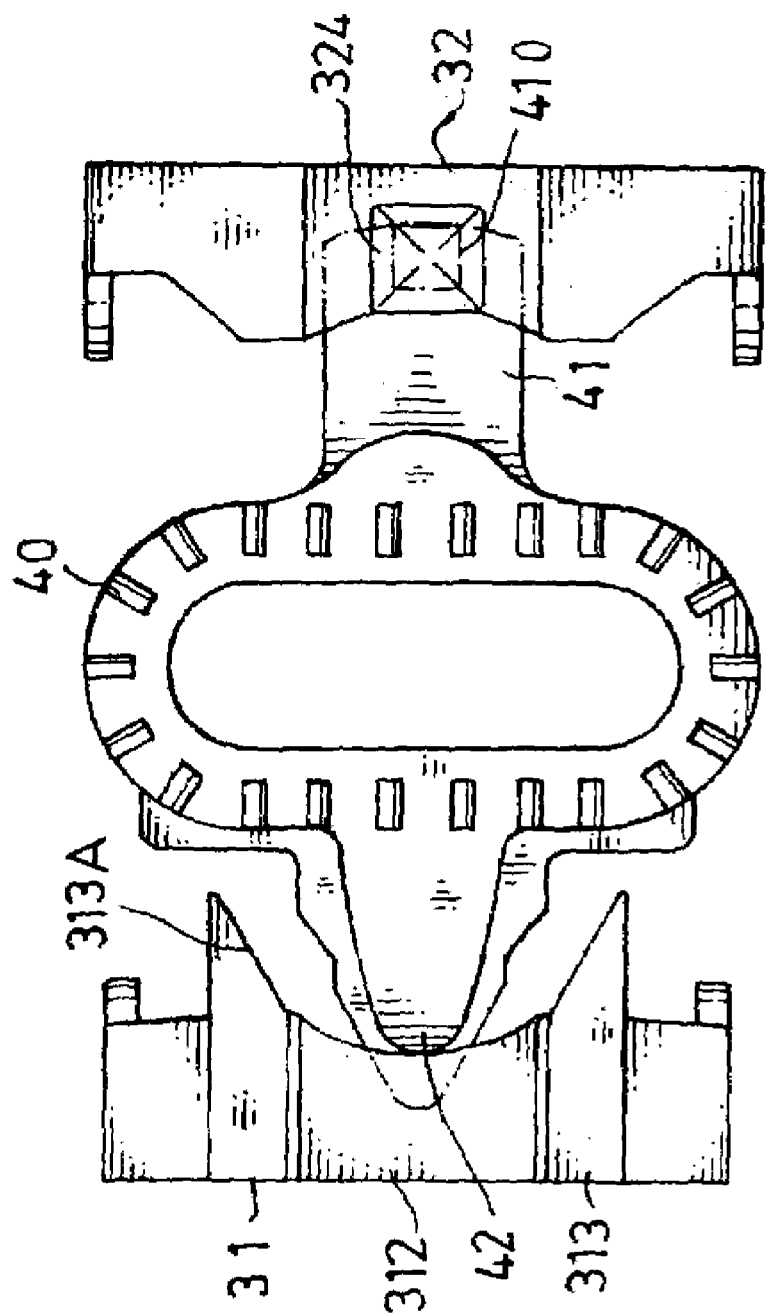
FIG. 4 is a top plan assembly view of the pedal structure for a bicycle as shown in FIG. 1.
Figure 5:
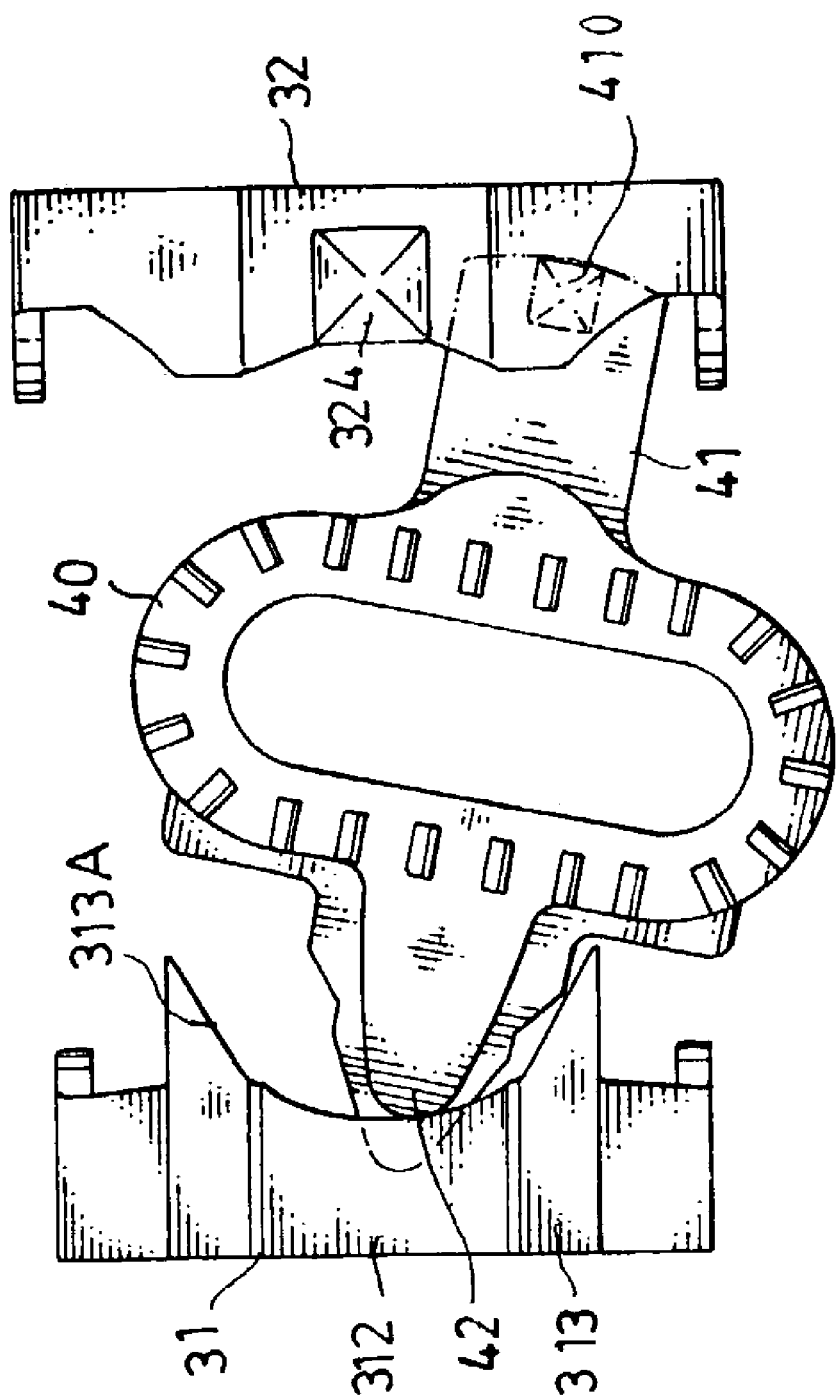
FIG. 5 is a schematic operational view of the pedal structure for a bicycle as shown in FIG. 4 in assembly.
Figure 6:
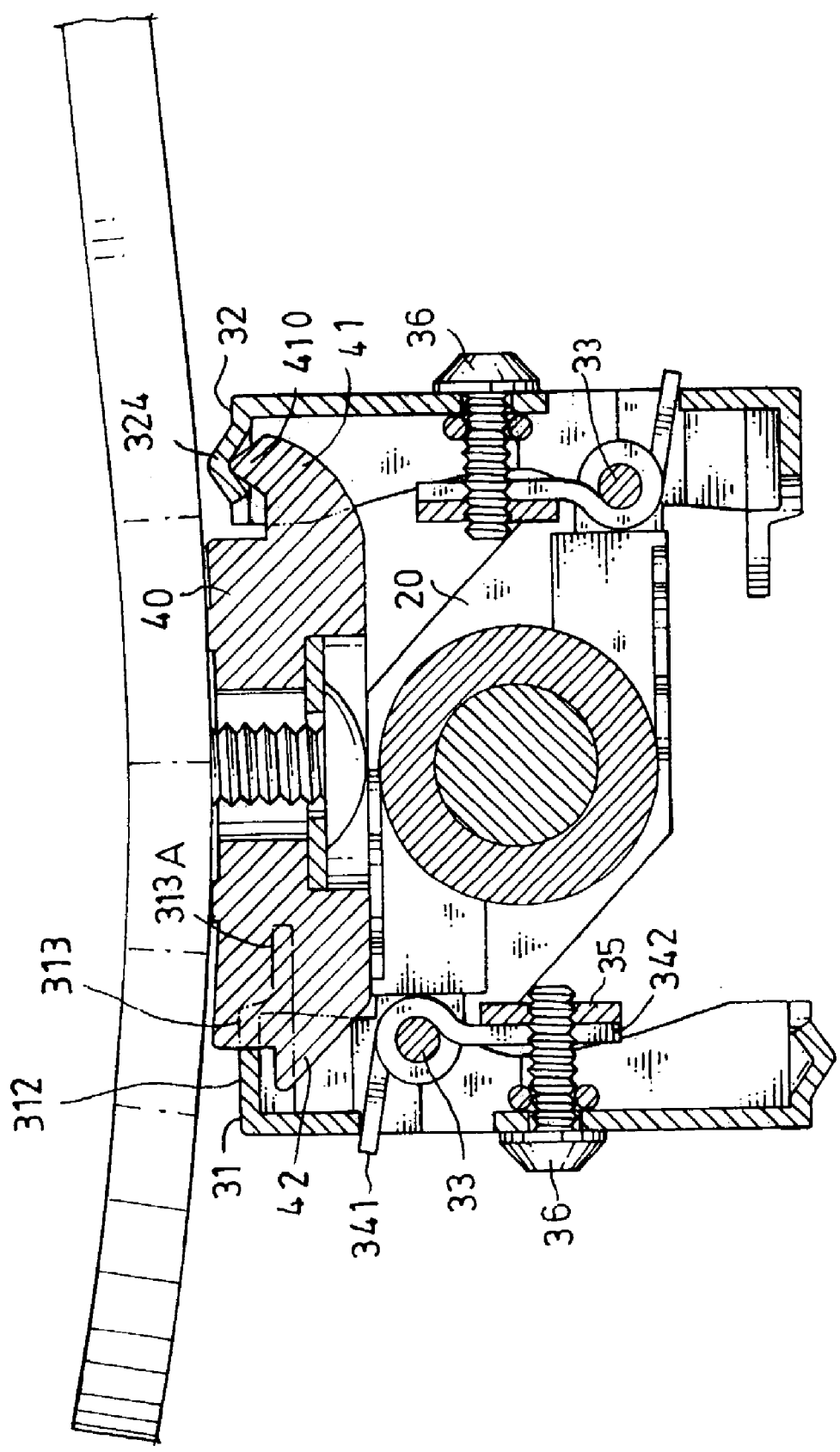
FIG. 6 is a side plan cross-sectional assembly view of the pedal structure for a bicycle as shown in FIG. 1.

Thus, the front binding plate 31 has an inward directed clamping force as indicated by the arrow shown in FIG. 3 during the normal state by the urging force of each of the two torsion springs 34, and the rear binding plate 32 has an inward directed clamping force as indicated by the arrow shown in FIG. 3 during the normal state by the urging force of each of the two torsion springs 34.

The pedal structure "A" further comprises a cleat 40 mounted on the pedal body 20 and clamped between the front binding plate 31 and the rear binding plate 32. The cleat 40 is secured on the bottom of a shoe (not shown). The cleat 40 has a front end 42 secured in the clamping portion 312 of the front binding plate 31 and rested on the resting edge 313A of the stepped portion 313 of the front binding plate 31. The cleat 40 has a rear end 41 formed with a protrusion 410 snapped into the concave portion 324 of the rear binding plate 32.

In practice, both of the front binding plate 31 and the rear binding plate 32 provide an inward directed clamping force. In such a manner, the front binding plate 31 and the rear binding plate 32 form an elastic receiving space for clamping the cleat 40 in an elastic manner, so that the cleat 40 can be mounted on and detached from the pedal body 20 easily and conveniently, thereby facilitating assembly and disassembly of the shoe (not shown). In addition, the cleat 40 can be clamped on the pedal body 20 rigidly and stably by the elastic clamping force of the front binding plate 31 and the rear binding plate 32.

When the cleat 40 is mounted on the pedal body 20, the front end 42 of the cleat 40 is initially inserted into the clamping portion 312 of the front binding plate 31 and rested on the resting edge 313A of the stepped portion 313 of the front binding plate 31. Then, the rear end 41 of the cleat 40 is snapped into the rear binding plate 32 with the protrusion 410 of the cleat 40 being snapped into and locked in the concave portion 324 of the rear binding plate 32, so that the cleat 40 is mounted on the pedal body 20 and clamped between the front binding plate 31 and the rear binding plate 32.

It is appreciated that, the distance between the pivot ear 311 and the clamping portion 312 of the front binding plate 31 (substantially equally to the radius of rotation) is shorter than that between the pivot ear 321 and the concave portion 324 of the rear binding plate 32 (substantially equally to the radius of rotation). Thus, the torque required for rotating the front binding plate 31 is greater than that required for rotating the rear binding plate 32. Thus, the front end 42 of the cleat 40 is initially inserted into the front binding plate 31 without having to provide a torque, and the rear end 41 of the cleat 40 is then snapped into the rear binding plate 32 by applying a smaller torque, thereby facilitating operation of the user, saving the manual energy, and satisfying the ergonomic design.

Figure 7:
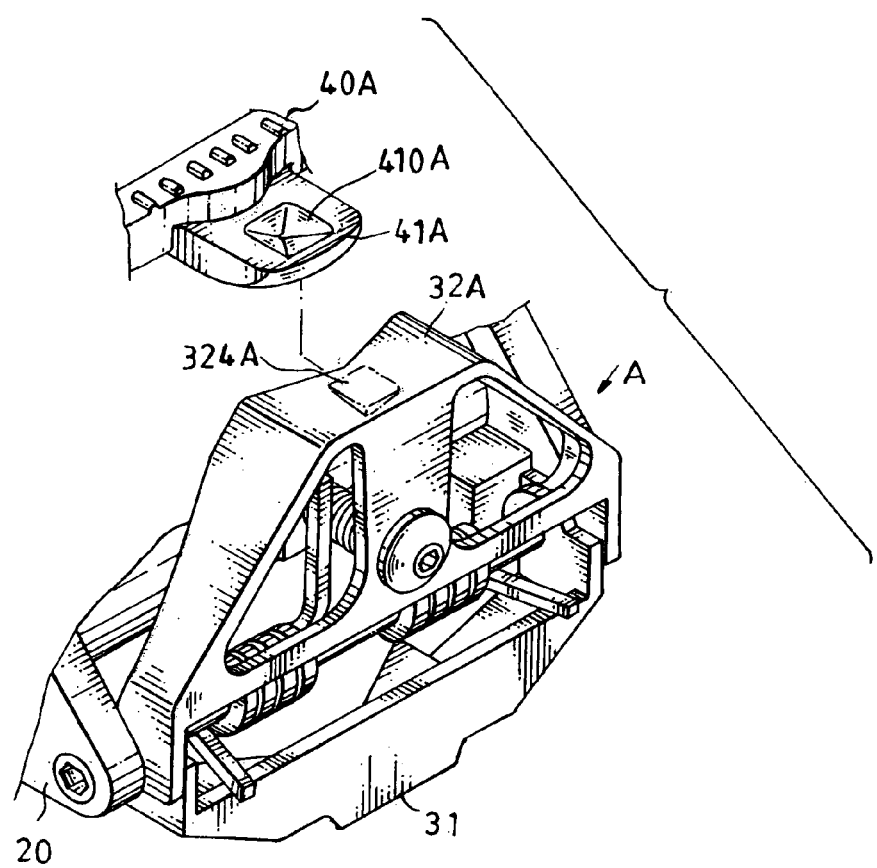
FIG. 7 is a partially cut-away exploded perspective view of a pedal structure for a bicycle in accordance with another embodiment of the present invention.

Referring to FIG. 7, in accordance with another embodiment of the present invention, the cleat 40A has a rear end 41A formed with a concave portion 41A, and the rear binding plate 32A has a bottom formed with a protrusion 324A snapped into the concave portion 41A of the cleat 40A.

Figure 8:
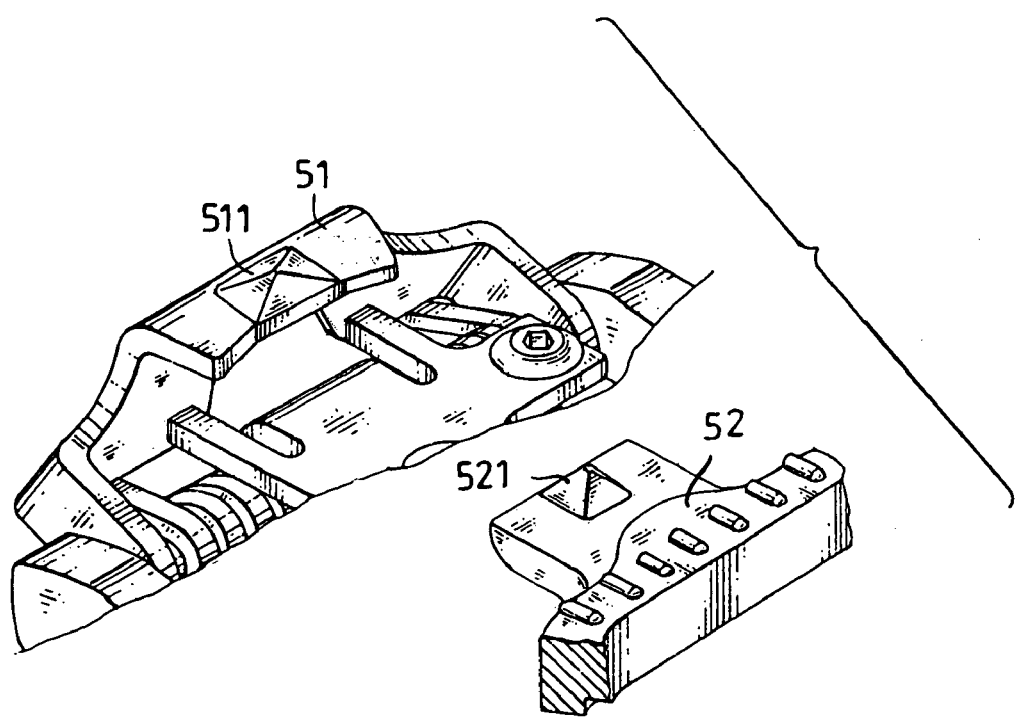
FIG. 8 is a partially cut-away exploded perspective view of a pedal structure for a bicycle in accordance with another embodiment of the present invention.

Referring to FIG. 8, in accordance with another embodiment of the present invention, the pedal binding plate 51 is formed with a concave portion 511, and the cleat 52 is formed with a protrusion 521 snapped into the concave portion 511 of the pedal binding plate 51.

Figure 9:
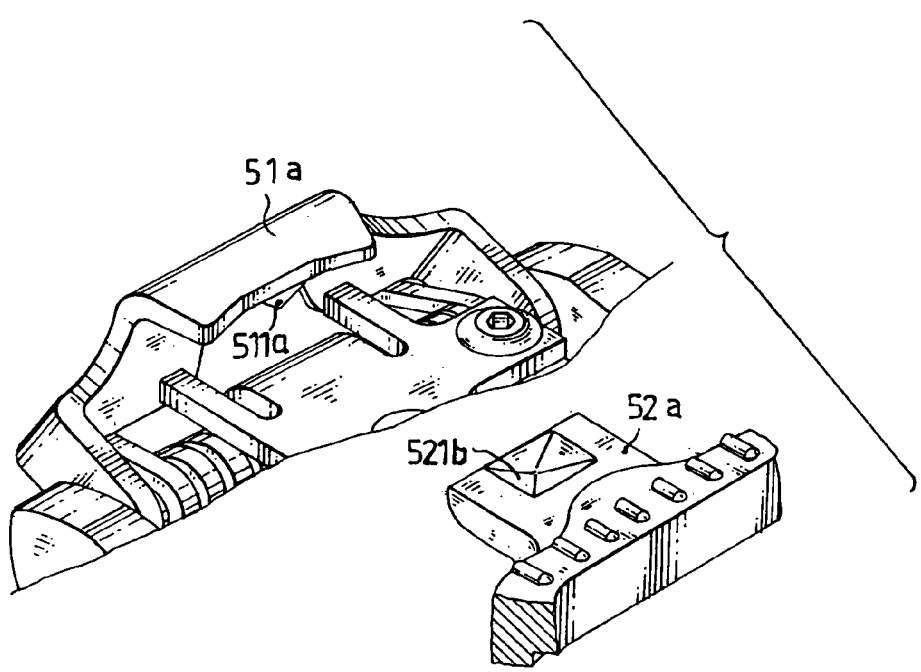
FIG. 9 is a partially cut-away exploded perspective view of a pedal structure for a bicycle in accordance with another embodiment of the present invention.

Referring to FIG. 9, in accordance with another embodiment of the present invention, the cleat 52a is formed with a concave portion 521a, and the pedal binding plate 51a is formed with a protrusion 511a snapped into the concave portion 521a of the cleat 52a.

Figure 10:
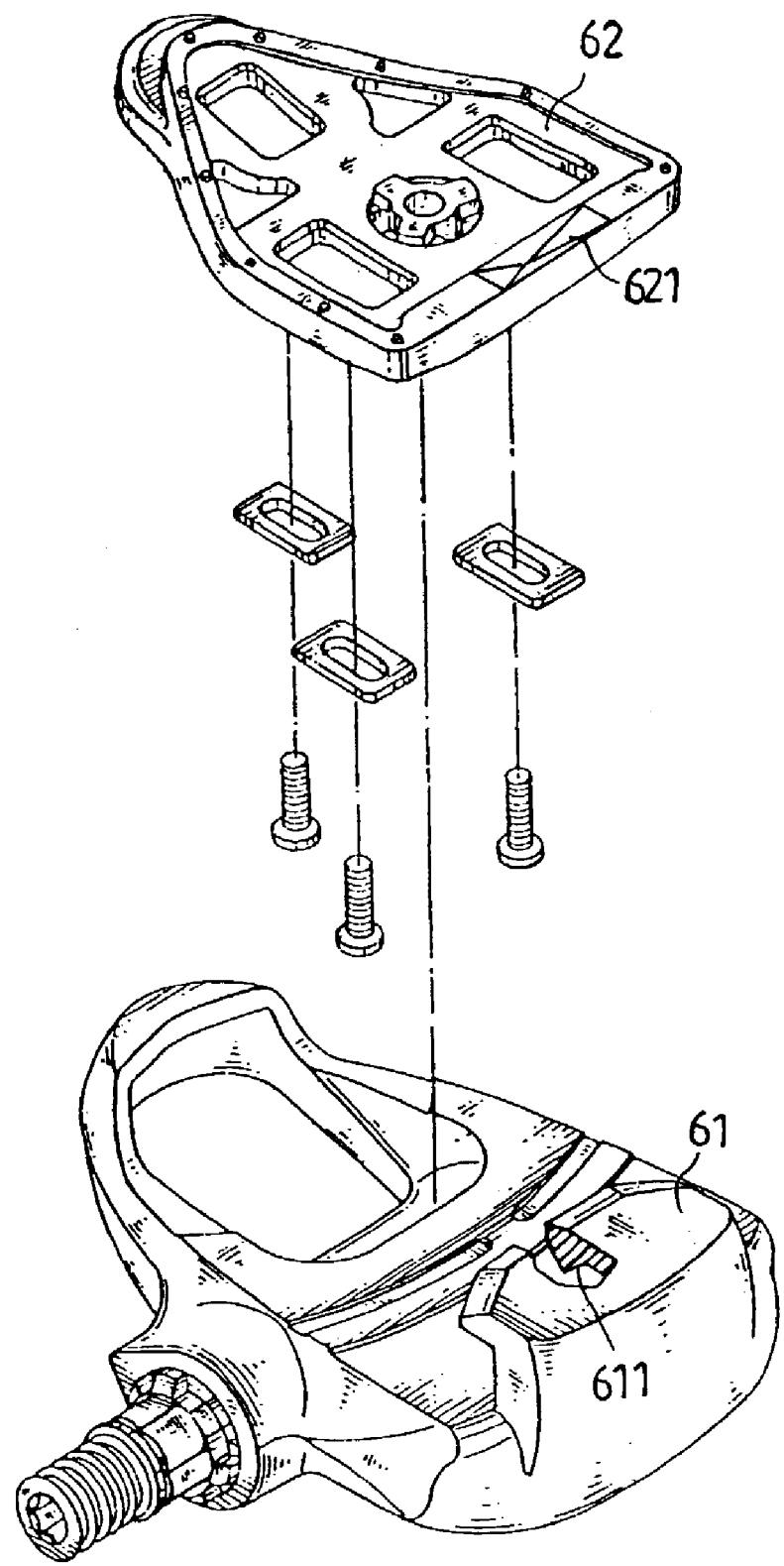
FIG. 10 is an exploded perspective view of a pedal structure for a bicycle in accordance with another embodiment of the present invention.
Figure 11:
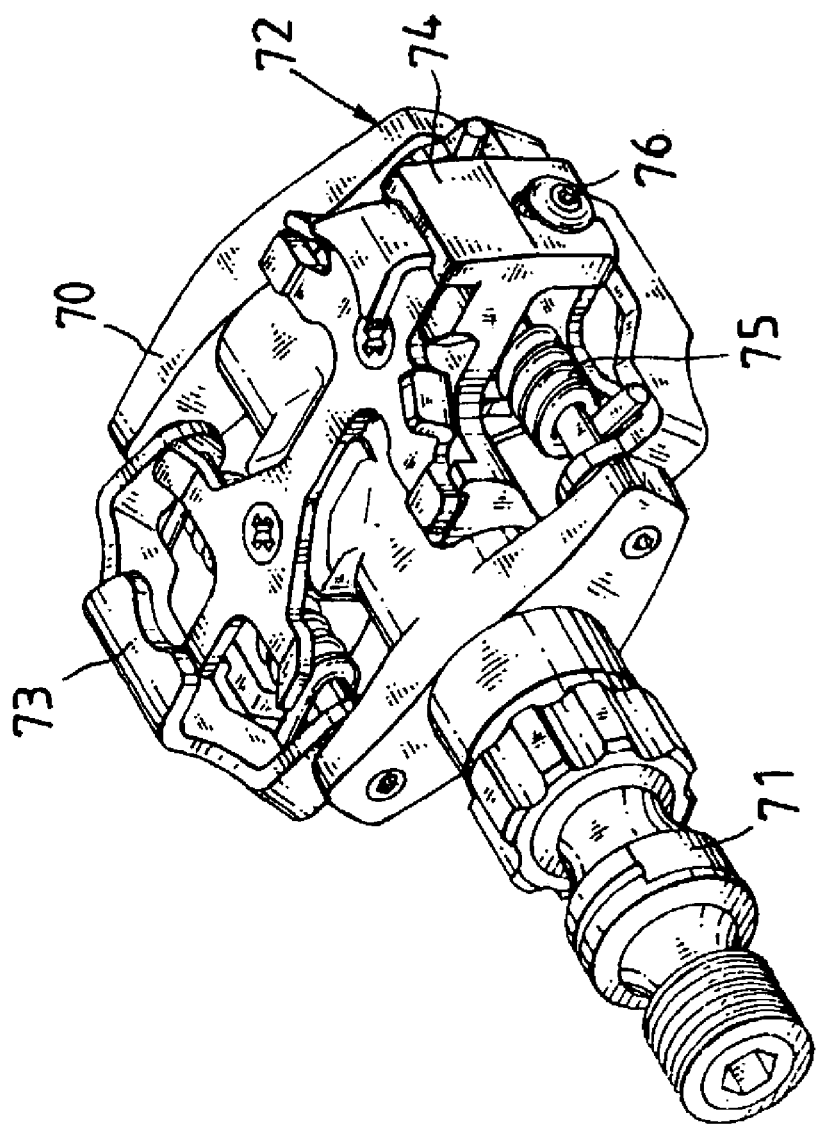
FIG. 11 is a perspective view of a first conventional pedal structure for a bicycle in accordance with the prior art.
Figure 12:
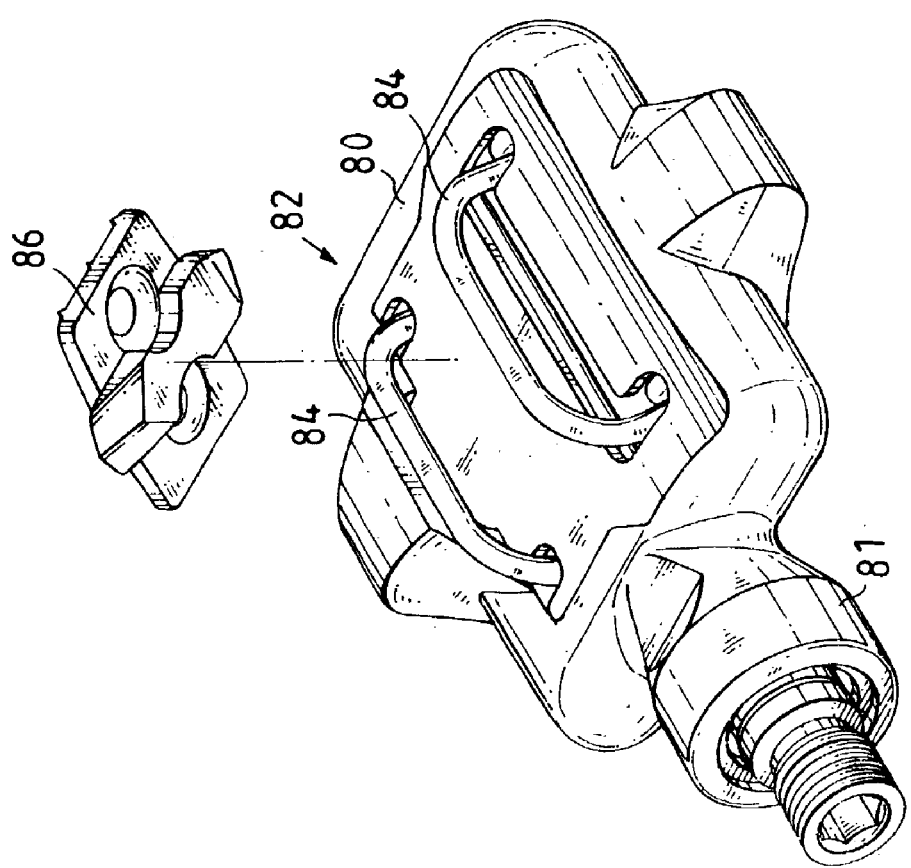
FIG. 12 is a perspective view of a second conventional pedal structure for a bicycle in accordance with the prior art.

Referring to FIG. 10, in accordance with another embodiment of the present invention, the rear binding plate 61 is formed with a concave portion 611, and the cleat 62 is formed with a protrusion 621 snapped into the concave portion 611 of the rear binding plate 61. Thus, the pedal structure is available for a single-faced clamping pedal which is used in the speed racing.

Accordingly, the pedal structure in accordance with the present invention has the following advantages.

1. The front binding plate 31 and the rear binding plate 32 provide an inward directed clamping force and form an elastic receiving space for clamping the cleat 40 in an elastic manner, so that the cleat 40 can be mounted on and detached from the pedal body 20 easily and conveniently, thereby facilitating assembly and disassembly of the shoe.

2. The cleat 40 can be clamped on the pedal body 20 rigidly and stably by the elastic clamping force of the front binding plate 31 and the rear binding plate 32.

3. The clamping force applied on the cleat 40 is evenly distributed by the front binding plate 31 and the rear binding plate 32, so that the cleat 40 can be mounted on and detached from the pedal body 20 easily and conveniently, thereby saving the manual energy.

4. The front binding plate 31 and the rear binding plate 32 co-operate to provide a larger clamping force, so that the cleat 40 can be clamped on the pedal body 20 rigidly and stably.

5. The distance between the pivot ear 311 and the clamping portion 312 of the front binding plate 31 is shorter than that between the pivot ear 321 and the concave portion 324 of the rear binding plate 32, so that the torque required for rotating the front binding plate 31 is greater than that required for rotating the rear binding plate 32. Thus, the front end 42 of the cleat 40 is initially inserted into the front binding plate 31 without having to provide a torque, and the rear end 41 of the cleat 40 is then snapped into the rear binding plate 32 by applying a smaller torque, thereby facilitating operation of the user, saving the manual energy, and satisfying the ergonomic design.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pedal structure for a bicycle, comprising a pedal body, and an elastic clamping device, wherein:
   the pedal body has two opposite sides;
   the elastic clamping device is mounted on each of the two opposite sides of the pedal body, and includes a front binding plate, a rear binding plate, a pivot shaft, at least one torsion spring, an urging plate, and an adjusting bolt, wherein:
   the pivot shaft of the elastic clamping device is secured on each of the two opposite sides of the pedal body;
   the front binding plate of the elastic clamping device is pivotally mounted on the pivot shaft;
   the rear binding plate of the elastic clamping device is pivotally mounted on the pivot shaft;
   the adjusting bolt of the elastic clamping device is extended through the rear binding plate;
   the urging plate of the elastic clamping device is secured on a distal end of the adjusting bolt;
   the at least one torsion spring of the elastic clamping device is pivotally mounted on the pivot shaft and has a first end passed through a gap defined between the front binding plate and the rear binding plate and urged on the front binding plate and a second end urged on the urging plate;
   the front binding plate has an inward directed clamping force provided by the urging force of the at least one torsion spring;
   the rear binding plate has an inward directed clamping force provided by the urging force of the at least one torsion spring;
   the front binding plate of the elastic clamping device has a center formed with a protruding clamping portion, and the rear binding plate of the elastic clamping device has a bottom formed with a concave portion
   the clamping portion of the front binding plate has two sides each formed with stepped portion which has a front end formed with a resting edge.

2. The pedal structure for a bicycle in accordance with claim 1, wherein the front binding plate of the elastic clamping device is substantially inverted U-shaped.

3. The pedal structure for a bicycle in accordance with claim 1, wherein the front binding plate of the elastic clamping device has two sides each formed with a pivot ear pivotally mounted on the pivot shaft, and the rear binding plate of the elastic clamping device has two sides each formed with a pivot ear pivotally mounted on the pivot shaft.

4. The pedal structure for a bicycle in accordance with claim 1, wherein the front binding plate of the elastic clamping device has two sides each formed with a pivot ear, the rear binding plate of the elastic clamping device has two sides each formed with a pivot ear, and the distance between the pivot ear and the clamping portion of the front binding plate is shorter than that between the pivot ear and the concave portion of the rear binding plate.

5. The pedal structure for a bicycle in accordance with claim 1, further comprising a cleat mounted on the pedal body and clamped between the front binding plate and the rear binding plate, wherein the cleat has a front end secured in the clamping portion of the front binding plate and rested on the resting edge of the stepped portion of the front binding plate and a rear end formed with a protrusion snapped into the concave portion of the rear binding plate.

6. The pedal structure for a bicycle in accordance with claim 1, wherein the rear binding plate of the elastic clamping device has a rear side formed with a through hole for passage of the adjusting bolt.

7. The pedal structure for a bicycle in accordance with claim 1, wherein the urging plate of the elastic clamping device is formed with a screw bore screwed on the distal end of the adjusting bolt.

8. A pedal structure for a bicycle, comprising a pedal body, and an elastic clamping device, wherein:
   the pedal body has two opposite sides;
   the elastic clamping device is mounted on each of the two opposite sides of the pedal body, and includes a front binding plate, a rear binding plate, a pivot shaft, at least one torsion spring, an urging plate, and an adjusting bolt, wherein:

the pivot shaft of the elastic clamping device is secured on each of the two opposite sides of the pedal body;

the front binding plate of the elastic clamping device is pivotally mounted on the pivot shaft;

the rear binding plate of the elastic clamping device is pivotally mounted on the pivot shaft;

the adjusting bolt of the elastic clamping device is extended through the rear binding plate;

the urging plate of the elastic clamping device is secured on a distal end of the adjusting bolt;

the at least one torsion spring of the elastic clamping device is pivotally mounted on the pivot shaft and has a first end passed through a gap defined between the front binding plate and the rear binding plate and urged on the front binding plate and a second end urged on the urging plate;

the front binding plate has a inward directed clamping force provided by the urging force of the at least one torsion spring;

the rear binding plate has an inward directed clamping force provided by the urging force of the at least one torsion spring;

the pedal structure further comprises a cleat mounted on the pedal body and clamped between the front binding plate and the rear binding plate, where the cleat has a rear end formed with a concave portion, and the rear binding plate has a bottom formed with a protrusion snapped into the concave portion of the cleat;

the front binding plate of the elastic clamping device has a center formed with a protruding clamping portion which has two sides each formed with a stepped portion which has a front end formed with a resting edge, and the cleat has a front end secured in the clamping portion of the front biding plate and rested on the resting edge of the stepped portion of the front binding plate.

* * * * *